United States Patent [19]

James et al.

[11] 4,036,585
[45] July 19, 1977

[54] BLEEDFAST PHTHALOCYANINE DYES FOR PAPER

[75] Inventors: Daniel Shaw James, Hockessin; Vincent Gerard Witterholt, Wilmington, both of Del.

[73] Assignee: E. I. Du Pont de Nemours and Company, Wilmington, Del.

[21] Appl. No.: 713,038

[22] Filed: Aug. 10, 1976

[51] Int. Cl.² .................. D06P 1/14; C09B 47/04
[52] U.S. Cl. .............................. 8/1 XA; 8/7; 162/162; 260/314.5
[58] Field of Search .............. 260/314.5; 8/1 XA

[56] References Cited
U.S. PATENT DOCUMENTS 2,863,875   12/1958   Bienert et al. .............. 260/314.5

FOREIGN PATENT DOCUMENTS 2,508,892   9/1975   Germany .............. 8/1 XA

Primary Examiner—John D. Randolph

[57] ABSTRACT

The novel copper phthalocyanine-based compound

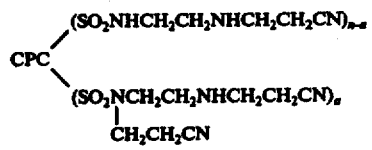

where $n$ is an average number of 3 to 4, $a$ is 0 to 3 but less than $n$, and CPC is copper phthalocyanine, and its acid solutions are blue dyes particularly for paper and have excellent bleedfastness. The compound is prepared by reacting copper phthalocyanine sulfonyl chloride with the cyanoamino compounds formed from the reaction between acrylonitrile and ethylenediamine.

5 Claims, No Drawings

BLEEDFAST PHTHALOCYANINE DYES FOR PAPER

BACKGROUND OF THE INVENTION

1. Field of the Invention

This invention concerns copper phthalocyanine-dyes and dye solutions especially valuable for dyeing paper. Use of these dyes provides blue paper whose color does not bleed in contact with common household substances such as milk, grease or household cleaners.

2. Prior Art

Copper phthalocyanine is widely known as useful for dyeing paper, at least when it is disubstituted with amino-methyl groups or when it is sulfonated. The outstanding light fastness and high tinctorial strength of copper phthalocyanine makes it unique among pigments, and from the time of its discovery dye manufacturers have directed their efforts to the discovery of a solubilized form suitable for textile dyeing and printing. Sulfonation gives a soluble product which has excellent strength and light fastness but is not fast to water-treatments, especially washing. Moreover, many dyes of this type, when used on dye-absorbent paper such as used for paper towels or handkerchiefs, tend to bleed when the paper is contacted with such materials as milk, grease or household cleaners. Since such paper must be very absorbent in order to be useful, very little or no alum and size can be applied. For instance, in the dyeing of so-called "tissue dyeings" no alum or size is used.

German patent application DT No. 2508892, Toji to Du Pont, published Sept. 4, 1975, discloses dyes of the formula $CPC-(CH_2N^+HR_1R_2X^-)_n$, where CPC is copper phthalocyanine $n$ is 3 or 4, $R_1$ is hydroxyalkyl or H but is at least 25% hydroxyalkyl, $R_2$ is H, alkyl or hydroxyalkyl, and X is a solubilizing anion. These dyes have high water-solubility and also resist leaching from paper. The methods for synthesizing these dyes either employ bischloromethyl ether or produce some of this very objectionable carcinogen as a by-product. Extreme precautions must be taken to protect personnel when bischloromethyl ether can be present, thereby exacting an economic penalty.

While dyes in powder form have been used to dye paper for many years, there is now a wide use of dye solutions containing at least 15%, and preferably 20% or more of active dye. Such solutions are very desirable for paper dyeing where the correct duplication of shade can be a problem, and where the "dusting" of dry dyes can be another problem. Unfortunately, a dye having the high solubility desired for use in the dyeing of paper may also be susceptible to bleeding from the resultant colored paper, particularly when no alum or size has been applied.

DETAILED DESCRIPTION OF THE INVENTION

A class of phthalocyanine dyes has now been discovered whose members are very substantive to paper and have high aqueous solubility, and at the same time exhibit great resistance to leaching from paper.

The dyes are prepared by reacting the product of the reaction between acrylonitrile and ethylenediamine with copper phthalocyanine sulfonyl chloride. They can be isolated and dried, if desired, in the form of their free amines, which have the formula

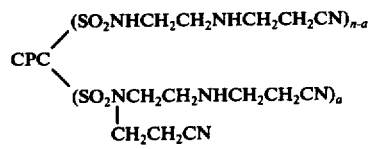

where $n$ is an average number of 3 to 4 and $a$ is 0 to 3 but less than $n$, and CPC denotes copper phthalocyanine. In this, their free amine form, the dyes are relatively insoluble in water.

Where a dye solution is desired, the dye is dissolved in aqueous acid, forming a solution of a dye salt which has the formula

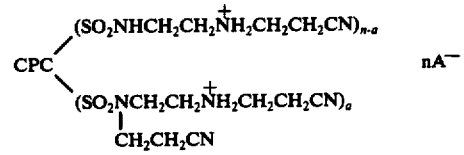

wherein $n$, $a$ and CPC are as defined above and $A-$ is a solubilizing anion.

The dye solutions can be prepared to contain 10 to 50% of dye (calculated as free amine) in a solvent comprising water and a water-miscible solvent. Their synthesis does not require the use of, or any exposure to, bis-chloromethyl ether.

These dyes differ from the prior art of the German publication mentioned above in that the dyes of the invention employ the $—SO_2—$ linking group in place of $—CH_2—$, and contain the cyanoalkyl moiety not present in the prior art dyes.

The dyes of the invention are outstanding in their bleedfastness to water, milk, grease and common commercial household cleaners and detergents, i.e., these materials do not dissolve the color from dyed paper under normal conditions of usage. This property could not have been foreseen or predicted from the prior art. It is most surprising that the dyes of this invention possess the desired water solubility on the one hand, and on the other hand provide bleedfast dyeings for absorbent paper.

The dye compositions of the invention can be made by a known sequence of reactions. In one embodiment, the sequence begins with C.I. Pigment Blue 15, 74160, Monastral Blue or copper phthalocyanine which has the structure

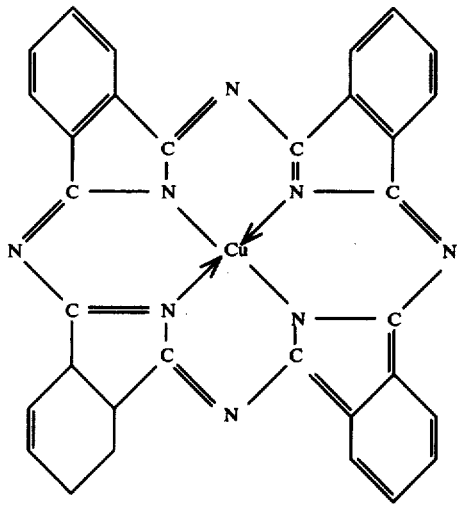

When copper phthalocyanine is heated with chlorosulfonic acid, a copper phthalocyaninesulfonyl chloride is formed. The reaction is illustrated in U.S. Pat. No. 2,219,330 to Nadler et al. The sulfonyl chlorides can also be made from copper phthalocyaninesulfonic acids by treatment with chlorinating agents such as phosphorus pentachloride or thionyl chloride.

Generally up to four sulfonyl chloride groups can be incorporated into the phthalocyanine molecule, but a portion of the product will consist of trisubstituted molecules. No separation of the tetra and tri-substituted molecules is made, and both contribute to the desired dye products of the invention. It is known to react CPC sulfonyl chlorides with amines to produce sulfonamides, and this reaction is utilized in preparing the dyes of the invention.

The amino compounds employed are products of the reaction between acrylonitrile and ethylenediamine. Dickerman and Simon in J. Org. Chem. 22, (1957) disclose a method for preparing N-cyanoethylethylenediamine by reacting an excess of ethylenediamine with acrylonitrile.

$$CH_2 = CH-CN + NH_2CH_2CH_2NH_2 \rightarrow NH_2CH_2CH_2NHCH_2CH_2CN$$

When an excess of acrylonitrile is used in this reaction, a substantial amount of the bis product is formed along with the monocyano compound.

$$2CH_2 = CH-CN + NH_2CH_2CH_2NH_2 \rightarrow NCCH_2CH_2NHCH_2CH_2NHCH_2CH_2CN$$

The components of the mixture can be separated by fractional distillation before reaction with CPC sulfonyl chloride, but this is not necessary. Dyes of satisfactory properties are obtained by using the mixture of mono and bis products.

The relative amounts of bis and monocyanoamines in the mixture can be determined by gas chromatography, although an accurate analytical method has not been developed. Amine mixtures having bis to mono ratios of from about 4/1 to 0.4/1 have been found to yield satisfactory dyes.

The reaction between acrylonitrile and ethylenediamine can be carried out at temperatures up to about 65° C. Acrylonitrile is added to ethylenediamine over a period of 2 to 8 hours, although longer addition times can be employed without ill effect. A very important variable in preparing the amine mixture is the reactant ratio used. Broadly a ratio of from about 0.3 to 1.8 moles of acrylonitrile can be used per mole of ethylene diamine. Preferably the mole ratio is between 1.1/1.0 and 1.3/1.0, since economy of operation and fluidity of the product solutions are promoted within these limits. While unreacted ethylenediamine can be removed easily by distillation, this is not necessary where the excess is 5% by weight or less. This can be achieved when the preferred mole ratios are used.

The amine mixture can be reacted with CPC sulfonyl chloride in an aqueous medium to produce a solid dye which can be isolated from the reaction mixture by filtration. The reaction can be carried out by diluting the amine mixture with water to make a 20 to 50% by weight solution of amines, then adding the CPC sulfonyl chloride. For each mole of amine reacting with the sulfonyl chloride one mole of hydrogen chloride is produced. The HCl can be removed by adding an equivalent amount of a weakly basic amine such as trimethylamine or triethanolamine, the resulting water-soluble salt is removed in the aqueous filtrate when the dye is isolated. Alternatively a 100% molar excess of the reactive amine mixture can be employed, half of the amine mixture then reacting with the hydrogen chloride to form a soluble salt which is similarly removed in the filtrate.

The reaction mass containing amines and CPC sulfonyl chloride can be heated to about 70°–75° C to complete the reaction in about 2 hours. After cooling the mixture, the solid dye can be isolated by filtration. After washing with water, the dye can be dried in an oven or used in filter cake form to prepare a solution.

The product of the reaction between the amine mixture and copper phthalocyaninesulfonyl chloride may contain a complex mixture of compounds, since the four (or three) sulfonyl chloride groups can react with the two amines in a number of ways. For example some of the individual dye products which may be present are $$CPC + SO_2-NHCH_2CH_2NHCH_2CH_2CN)_4,$$

$$CPC + SO_2-NCH_2CH_2NHCH_2CH_2CN)_4, \text{ or}$$
$$\qquad\qquad\quad |$$
$$\qquad\qquad CH_2CH_2CN$$

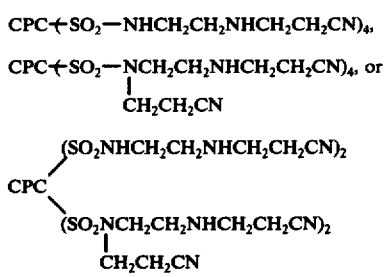

All of these forms as well as other obviously possible products are included in the general formula presented. The corresponding dye salt forms are also part of the invention.

Dye solutions can be formed by mixing the solid dye with aqueous acid. While solutions can be formed with hydrochloric, phosphoric and other inorganic acids, acetic acid is preferred. An excess of acetic acid can be used (beyond that necessary to form the dye salt) to aid in dissolving the dye and to lower the viscosity of the solution. Preferred solutions are those containing 15 to 20% by weight of dye (calculated as free amine) and 15 to 20% acetic acid. Lower solution viscosity is also promoted by using supplemental water-miscible solvents. For this purpose some useful solvents are ethylene glycol, diethylene glycol and the mono and dimethyl and ethyl ethers of ethylene glycol and diethylene glycol. These solvents can be used in up to a 1/1 ratio with the water present. Solutions of lower viscosity are easier to pour and to handle in dyeing operations.

The dyes are especially useful for dyeing cellulose fibers such as cotton, rayon, and particularly paper. Dyeing can be carried out at room temperature or even at low temperatures (down to 4° C). Preferred pH of the dye bath is 5.0 to 6.0. On tissue the dyes are particularly bleedfast to water, milk, fat and other substances with which absorbent paper is likely to come into contact in the home, as will be illustrated hereinafter. The dyes are 100% substantive on paper; they dye just as well with or without size present. Substantially all of the dye exhausts onto the cellulose, and little or none is left in solution. The dyes are also very resistant to bleaching.

Dyeing of paper with these dyes can be carried out in the normal manner. After the pulp has been beaten to the desired condition, the dye is added, and pH adjusted as desired by addition of acid or base. The amount of dye used depends on the depth of color desired, usually 5 lbs. or less of dye (100%) per 1,000 pounds of dry paper stock is sufficient. The dyed paper is formed and processed in the usual way, i.e., using a Fourdrinier machine, and is finally dried. The dyes of the invention can be used to color any kind of cellulosic paper but, as mentioned, are especially useful for coloring tissue and other absorbent papers. This type of paper is used for handkerchiefs, towels, cleaning cloths and wherever the absorbent property is desired.

Naturally the bleeding or removal of color from the paper to the skin, to food, to a table top or other household article is undesirable, yet many known paper dyes have this unwanted property, and are not useful for dyeing tissue. The dyes of the invention do not bleed significantly in contact with most commonly used household materials (except for acidic products, such as vinegar).

TEST PROCEDURE

In order to test the bleedfastness of the dyestuffs of the invention the following test procedure was applied to dyed tissue handsheets, prepared as 8½ inch square sections:

Cut a 1 × 6 inch strip from a prepared tissue handsheet and fold it into a 1 × 1 inch square. Dip this into a testing solution, of which a number are listed below, and place it on three blotters which have been saturated with the same solution. Put two more saturated blotters on top of the dyed tissue sample, forming a sandwich. (Three saturated blotters on the bottom, a saturated tissue handsheet in the middle, and two saturated blotters on the top).

Place the five blotters on a hydraulic press, apply 50 psi pressure for one minute, and release. Remove the blotters, and discard the two top and bottom blotters, leaving one blotter and the sample. Remove the sample and dry the blotter on the drum dryer. Once dried, the blotter is judged for bleedfastness.

Standard bleed solutions:

1. Water
2. 50/50 Water-Alcohol
3. 0.5% "Aerosol" OT (American Cyanamid Co.)
4. Milk
5. Saturated "Comet" Cleanser (P & G)
6. 0.5% "Ivory" Soap Solution (P & G)
7. "Formula 409" (The Clorox Company)
8. "Windex" (The Drackett Company)

The commercial products, "Comet" cleanser, "Ivory" soap, "Formula 409," and "Windex" represent a range of common household cleaning materials. "Aerosol" OT is sold as simulated mucous for testing purposes.

Bleedfastness grades are assigned according to the scale:

5 = negligible or no bleed
4 = slight bleed
3 = noticeable bleed
2 = considerable bleed
1 = heavy bleed Paper tissues dyed with the dye compositions of the invention, illustrated in the Examples which follow, are satisfactorily bleedfast to all of the listed reagents. In addition they strongly resist bleeding when contacted by the grease exuded from cooked ground beef.

The dyes of the invention have also been found useful for dyeing synthetic fibers of acrylic polymers, as well as fibers of cationic-dyeable polyesters and polyamides.

There follow some examples illustrative of the invention in more detail. In these examples, parts and percentages are given by weight.

EXAMPLE 1

A. Preparation of Amine Mixture

In a suitable vessel 466 parts of acrylonitrile (8.8 moles) was gradually added to 480 parts of ethylenediamine (8.0 moles) over a 4-hour period with good agitation. Temperature was maintained in the reaction mass at 5°–10° C. The reaction mass was stirred for another hour at 5°–10° C and then allowed to warm to room temperature overnight, while stirring.

Low boiling material was distilled from the mass at an absolute pressure of 30 mm of mercury and a temperature up to 104° C. There was obtained 93.7 parts of distillate, mainly ethylenediamine. The undistilled portion, 844.3 parts, was used for preparation of dye in Example 1, Part C. It had a bis to mono product ratio of about 0.65 to 1.

B. Preparation of CPC Tetrasulfonyl Chloride

The vessel used for this preparation was equipped with a thermometer, reflux condenser, dropping funnel, and a drying tube to protect the system from atmospheric moisture. Chlorosulfonic acid (520 parts, 4.44 moles) was added to the vessel and cooled to 0° C. To the agitated chlorosulfonic acid was added 65.2 parts of copper phthalocyanine (0.12 mole) while the temperature was held at 0° to 10° C. When all of the CPC had been charged, the mixture was heated over 1 hour to 100° C, and over the next hour to 145° C. Agitation at 140°–145° C was continued for 4 hours. The mixture was then cooled to 80° C and thionyl chloride (206.4 parts, 1.72 moles) was added over 15 minutes. The mixture was stirred at 80° C for another hour, then allowed to cool to room temperature overnight.

The cooled mixture was poured into a mixture of 2,400 parts of ice and 480 parts of sodium chloride while holding the temperature at 0° C or below. After stirring for 20 minutes the mixture was filtered to isolate the solid product. The filter cake was washed with 2,000 parts of cold, aqueous 1% hydrochloric acid, then with 400 parts of water. As much water as possible was removed from the cake.

Two runs as described gave 616 parts of CPC tetrasulfonyl chloride in wet cake form.

C. Preparation of Crude Dye

The 616 parts (0.228 moles) of CPC tetrasulfonyl chloride from B was added with agitation to a mixture of 244.4 parts of amine from A (1.833 moles calculated) and 400 parts of water. The temperature was allowed to rise to 45° C. The mixture was heated to 60° C and held at 60°-70° C for 2 hours, then cooled to room temperature and stirred overnight. The solid dye was isolated by filtration and the filter cake washed with 800 parts of water, giving 608 parts of wet cake with a dry solid content of 28% (170.3 parts). The dry dye had a maximum light absorption at 664 millimicrons with an absorptivity of 54.0 liters per gram cm.

D. Preparation of Dye Solution

A 583 part portion of the wet cake from C. was added with stirring to 350 parts of a 50% by weight solution of aqueous acetic acid and heated at 50°-60° C for 2 hours. The solution was cooled to room temperature. Recovery was 848.9 parts. A portion of the solution (824.2 parts) was diluted with 67.8 parts of water to give 892 parts of 28.67% of solution product.

E. Preparation of Dyed Tissue Paper

Into a stainless steel beaker were placed 3 g of defibered, bleached sulfite pulp and 100 g of water having hardness of 200 ppm (half calcium, half magnesium), and dye added. The amount of dye can be adjusted, based on the depth of color desired and the strength of the dye solution. For the tests herein, 1½ g of the dye solution was diluted to 500 ml, and 20 ml of the diluted solution added to the pulp slurry. After stirring for 20 minutes at 22°-24° C, an additional 600 g of water was added and the slurry filtered in an 8 by 8 inch mold containing a fine screen, to form a wet sheet. The sheet was pressed in a horizontal press at 100 lbs./sq. in. then dried on a drum dryer at about 95° C. The dry tissue handsheet was examined for shade and dye strength, and tested for bleedfastness as already described.

Paper dyed with the solution of D. was an attractive blue in color. The dye exhibited 100% substantivity, i.e., the dyeings were as strong in the absence of size and alum as when they were present.

Results of the tests for bleedfastness are shown in Table I.

TABLE I

| BLEEDFASTNESS - TISSUE DYEINGS | |
|---|---|
| Test Material | Grade |
| Water | 5 |
| 50/50 Water/Alcohol | 5 |
| 0.5% "Aerosol" OT Solution | 5-4 |
| Milk | 5-4 |
| 0.5% "Ivory" Liquid, 120° F | 5-4 |
| Saturated "Comet" Cleaner | 4 |
| 6.0% Acetic Acid Solution | 1 |
| "Formula 409" | 4 |
| Hamburger (cooked) | 5 |

EXAMPLE 2

Preparation of Dye Solution

The amine preparation followed the same general procedure described in Example 1, A. In a suitable vessel 185.5 parts (3.5 moles) of acrylonitrile was added to 120 parts (2.0 moles) of ethylenediamine at 5°-10° C over a 2-hour period and stirred at that temperature for an additional hour. Just 5 parts of low-boiling material (ethylenediamine) was removed by distillation under 12 mm of absolute pressure at a temperature up to 77° C. The residue amounted to 292.7 parts. The ratio of bis product to mono was about 4 to 1.

CPC sulfonyl chloride was prepared in the manner described in Example 1, B., and 75.9 parts of the wet filter cake (0.0285 mole, 27.8 parts of 100%) was added to a mixture of 50 parts of water and 30.4 parts of the above-prepared amine mixture, the temperature rising to 45° C. The mixture was then heated at 60°-70° C for 1 hour and finally allowed to cool to room temperature. The solid dye was separated by filtration and washed on the filter with 100 parts of water, giving 56.0 parts of wet filter cake. The cake was dissolved in 50% aqueous acetic acid to form 261 parts of dye solution, which was quite viscous, though pourable. Results of bleedfastness tests, on paper tissue dyed with this dye solution in the manner described in Example 1, (E), are shown in Table II.

TABLE II

| BLEEDFASTENESS TESTS - TISSUE DYEINGS | |
|---|---|
| Test Material | Grade |
| $H_2O$ | 5 |
| 50/50 $H_2O/C_2H_5OH$ | 5 |
| 0.5% "Aerosol" OT Solution | 5-4 |
| Milk | 4 |
| 0.5% "Ivory" Liquid, 120° F | 4 |

EXAMPLE 3

Preparation of Dye Solution

The amine mixture was prepared as described in the previous example except that the mole ratio of acrylonitrile to ethylenediamine was 3.0/2.0 instead of 3.5/2.0. After distilling off the low-boiling material, 253.7 parts of residual product remained. Analysis by gas chromtograph indicated a 2/1 bis/mono ratio. Reaction of the amine mixture with CPC sulfonyl chloride was carried out as in Example 2, with recovery of 61.4 parts of dye filter cake. When this cake was dissolved in 50% aqueous acetic acid, 130.8 parts of dye solution resulted. The solution was much more fluid than that of Example 2.

Dye tests on tissue paper prepared as in Example 1, (E) employing the prepared solution were satisfactory in shade and strength. Results of bleedfastness tests are shown in Table III.

TABLE III

| BLEEDFASTNESS TESTS - TISSUE DYEINGS | |
|---|---|
| Test Material | Grade |
| $H_2O$ | 5 |
| 50/50 $H_2O/C_2H_5OH$ | 5 |
| 0.5% "Aerosol" OT Solution | 4 |
| Milk | 4 |
| 0.5% "Ivory" Liquid, 120° F | 4 |

EXAMPLE 4

Preparation of Powder Dye and Dye Solution

In a suitable vessel 79.5 parts of acrylonitrile (1.5 moles) was added to 270 parts of ethylenediamine (4.5 moles) over a 2-hour period at a reaction temperature of 20°-25° C. The mixture was allowed to stir at room temperature overnight. Low-boiling material, largely ethylenediamine, was removed by distillation at 42° to 61° C under 35 mm absolute pressure. The amount of distillate was 182 parts, while 160.3 parts of mixed amine product remained as residue. The ratio of bis product to mono in the mixture was about 0.4 to 1.

Dye was prepared in the manner described in Example 2, reacting 57 parts of the above-prepared amine mixture (0.46 mole) in 100 parts of water with 0.057 mole of CPC sulfonyl chloride in the form of wet filter cake. After reacting 1 hour at 60°–70° C, the dye mixture was allowed to cool to room temperature and stirred overnight. The solid dye, after separation by filtration, was washed with 200 parts of water, and 128.2 parts of wet filter cake was isolated. Half of the cake was dried at 60° C in a vacuum oven yielding 30.1 parts of dark blue dye powder. The remaining half of the filter cake was dissolved in 70 parts of 50% aqueous acetic acid, holding the mixture at 40° C for 45 minutes to form 126 parts of 23.9% dye solution (1). A 30.6% dye solution (2) was also formed by dissolving 25 parts of the dried dye in 65 parts of 50% aqueous acetic acid.

Results of bleedfastness tests on dyed tissue paper prepared as in Example 1, E., using dye solution (1) are shown in Table IV.

TABLE IV
BLEEDFASTNESS TESTS - TISSUE DYEINGS

| Test Material | Grade |
|---|---|
| H$_2$O | 5 |
| 50/50 H$_2$O/C$_2$H$_5$OH | 5 |
| 0.5% "Aerosol" OT Solution | 5–4 |
| Milk | 5 |
| 0.5% "Ivory" Liquid, 120° F | 5–4 |

EXAMPLE 5

A. Preparation of Amine Mixture

In a suitable vessel 240 parts (4.0 moles) of ethylenediamine was added to 254.4 parts (4.8 moles) of acrylonitrile at 5°–10° C over an 8-hour period. After an additional 1-hour agitation at 5°–10° C the mixture was allowed to warm to room temperature. There was obtained 490 parts of clear, water-white liquid. The mixture was evenly divided into an A portion and a B portion. The A portion was used to prepare dye directly, without removal of low boilers. The B portion was subjected to topping, 16 parts of low boiling distillate being removed at 22 mm absolute pressure and 88° C, while 226.8 parts of residue remained.

B. Preparation of Dye Solution

CPC sulfonyl chloride filter cake was prepared as in Example 1, B. To a mixture of 100 parts of water and 60.8 parts of the amine mixture A there was added 139.8 parts (0.57 mole) of the CPC sulfonyl chloride, allowing the temperature to rise, then heating at 60°–70° C for 1 hour. After cooling to room temperature, the solid dye was removed by filtration and washed with water, yielding 141.1 parts of wet filter cake. The cake was mixed with 100 parts of 50% aqueous acetic acid and stirred at 50°–60° C for an hour, then cooled to room temperature. In order to achieve greater fluidity, another 10 parts of 50% acetic acid was stirred into the solution. A total of 237.6 parts of solution was obtained.

Tissue paper dyeings employing this solution were satisfactory in shade and strength.

The bleedfastness tests on dyed tissue paper with water, 50/50 water/ethanol, 0.5% solution of "Aerosol" OT, milk and 0.5% solution of "Ivory" Liquid were all 5 or 5–4, very satisfactory.

EXAMPLE 6

Preparation and Isolation of N-cyanoethylethylenediamine and Dye Therefrom ($a$ of formula = 0)

In a suitable vessel 79.5 parts (1.5 moles of acrylonitrile was added dropwise with stirring to 270 parts (4.5 moles) of ethylenediamine over 90 minutes. After standing overnight the mixture was distilled under reduced pressure, yielding 184 parts of ethylenediamine, and 100.1 parts of N-cyanoethylethylenediamine. There remained undistilled 43 parts of residue. Boiling point of the N-cyanoethylethylenediamine was 162°–171° C at 55 mm abs. pressure.

A 27.1 part portion of N-cyanoethylethylenediamine was reacted with CPC sulfonyl chloride as in Example 1, Part C, and the resulting dye filter cake was dissolved in 60 parts of 83.5% acetic acid. The filtered solution of dye, 109.3 parts was tested on tissue paper dyeings. Shade and strength were satisfactory as were bleedfastness tests with water, 50/50 water/ethanol, 0.5% "Aerosol" OT Solution and milk. The test with 0.5% "Ivory" Liquid at 120° F was borderline, graded 4–3.

We claim:

1. A dye of the formula

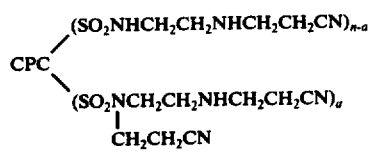

wherein $n$ is an average number of 3 to 4, $a$ is 0 to 3 but less than $n$, and CPC is copper phthalocyanine.

2. The salt of the dye of claim 1 of the formula

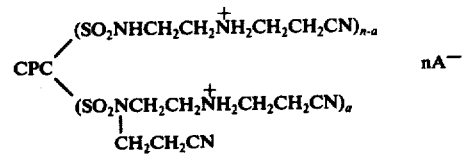

wherein $n$, $a$, and CPC are as in claim 1 and $A^-$ is a solubilizing acid anion.

3. A 10–50% by weight aqueous solution of the dye salt of claim 2.

4. The aqueous dye salt solution of claim 3 comprising a mixture of water and a water-miscible solvent.

5. The dye of claim 1 wherein $a$ is 0.

* * * * *